Patented Apr. 3, 1928.

1,664,689

UNITED STATES PATENT OFFICE.

LUDWIG KERN, OF BALTIMORE, MARYLAND.

PROCESS OF MANUFACTURING CHAMOTTE MATERIALS.

No Drawing. Application filed October 13, 1925. Serial No. 62,307.

The present invention relates to the manufacture of chamotte of particularly high grade, having valuable physical and chemical properties, and relates particularly to the manufacture of the grog to be used in making such chamotte.

As is well known in the art, it is customary to form plastic clay into sheets, bricks and the like, to then burn the same at a high temperature, after the plastic material has been dried, and to thereafter crush the burned material to a granular form, and to then mix the granulated material with the necessary amount of plastic clay and form the same into blocks, slabs or other shaped articles, and to then burn the same. Products made in this manner are ordinarily termed "chamotte" and are used in various industries where it is desirable to employ high temperatures. Thus muffles, and various pots for use in metallurgy are commonly made in the art.

In order to obtain good quality of grogs, clay alone is sometimes used, but on account of its tendency to shrink at high temperatures, as well as being subject to chemical changes, clay does not give satisfactory results, most clays being open to certain objections, and in many cases the grog is found to possess a foamy and inflated structure, which is objectionable. Attempts have heretofore been made to overcome these difficulties by burning the grog at temperatures substantially higher than those to be applied during the final use of the ware made from the chamotte. However, in such cases the product did not always have the necessary physical and chemical resistance to wear, and lacked elasticity during the sintering period. Further attempts to overcome the difficulty consisted in the addition (in the making of grog) of quartz, quartz sand or ordinary sand, being mixed with the clay, thus utilizing the expanding property of the quartz, to overcome the shrinking properties of the clay, while exposed to the high temperatures in the burning operation. Such results however were not entirely satisfactory since the added materials were found to considerably injure the physical properties of the bounding agents used in making the chamotte, especially so when large quantities of quartz or sand were employed. The products produced in such prior processes were found to be lacking in resistance to high temperatures and were also found to be more or less weak and irregular in composition and property.

In accordance with the present invention, I have found it possible to overcome the said difficulties by using woody substances, which are employed in finely divided state and which are consumed during the burning of the grog, leaving the latter porous. To the materials used in the preparation of the grog I also add a cementitious agent, such as Portland cement, natural cement, magnesium chloride or oxychloride, precipitated magnesium silicate or ball clay, or materials which form cement during the heating operation or during the moistening operation. Kaolin in an unburned condition forms the basis (or major constituent) of the grog material, and to this is added from 5 to 25% of woody substance and about the same amount of the binder, water of course being used in amount sufficient to form a plastic mass which is then burned as in the prior art, after which the burned material in the form of bricks, slabs or the like is crushed up, and on account of its texture it crushes easily to a granular mass of the desired size, in contradistinction to the grog substances heretofore employed which after burning are hard and are found to grind with difficulty.

The ground or granular material, after being separated into the desired sizes by means of suitable screens, is then made up into chamotte in the usual and well known manner.

The use of wood, preferably in the form of wood flour or finely powdered wood or other finely divided wood, in being burned out leaves a fine porosity throughout the entire bricks of the burned grog.

In order to more fully illustrate the invention, I give the following example, but it is to be understood that the invention is not limited thereto.

To 2000 pounds of finely ground kaolin, preferably ground sufficiently fine to pass a 200 mesh sieve, there is added 500 parts of pulverized wood, of a sufficient degree of fineness to pass a 70 mesh screen, and one fifth of a ton of ball clay, of a fineness sufficient to pass a 100 mesh screen. The mixture is then moistened with a sufficient amount of water to render the same plastic, and (after drying) is then subjected to a high temperature in a suitable kiln, a temperature of 2700° F., being found very suitable. The plastic mass is preferably molded into the form of bricks or slabs before the burning operation, but it could be molded into any other desired shape. It can be subjected to high pressure in the molding operation, although this is not necessary in all cases. The bricks or slabs can be first dried at a low temperature, say a temperature between 150 and 220° F., in order to remove the bulk of the water, before subjecting to the high temperature.

In some cases, where it is desired to produce a stronger sintering of the grog mass during the burning operation, it is advisable to add a small amount of colloidal silicic acid, for example about 2 to 10%. Keiselguhr (uncalcined) can be added for this purpose if desired.

The proportions and temperatures given in the example, are given for the purpose of illustration only, and can be varied between wide limits depending upon the exact nature of the raw materials used, their purity, fineness and the properties desired in the final product.

Slabs, muffles and the like made by the use of the present invention will be found to be of very high strength, and will be found to be resistant to high temperatures, without warping or cracking.

It will be understood that in place of the use of wood, I can use various other forms of organic matter of a combustible nature, which will burn out during the burning operation, to leave the desired porosity. Wood is merely mentioned on account of its cheapness.

I claim:—

1. A process of producing grog material suitable for use in chamotte which consists in forming a plastic mass of kaolin, combustible organic matter, a binder, all being in a finely divided state, and water, burning such material at a strong glowing heat, and comminuting the product.

2. A process of producing grog material suitable for use in chamotte which consists in forming a plastic mass of kaolin, combustible organic matter, a binder, all being in a finely divided state, and water, subjecting such mass to high pressure, burning such material at a strong glowing heat, and comminuting the product.

3. A process of producing grog material suitable for use in chamotte which consists in forming a plastic mass of kaolin, combustible organic matter, a binder, all being in a finely divided state, and water, drying such mass at not substantially over the boiling point of water, burning such material at a strong glowing heat, and comminuting the product.

4. A process of producing grog material suitable for use in chamotte which consists in forming a plastic mass of kaolin, combustible organic matter, a binder, all being in a finely divided state, and water, burning such material at a temperature approaching 2700° F.

5. A mode of producing chamotte material which consists in thoroughly mixing clay rich in kaolin, woody material and a cementitious binder, with enough water to form a plastic mass, the clay being the predominant solid constituent of such mixture, shaping such mixture, burning the same at a white heat, and comminuting the product, and thereafter binding the comminuted material by adding a binder and again burning the product.

6. In a process as in claim 1, the addition to the initial plastic mass, of hydrated silicic acid, at any stage prior to the burning operation, whereby the amount of sintering during burning, is increased and a stronger grog produced.

In testimony whereof I affix my signature.

LUDWIG KERN.